US009077618B2

(12) United States Patent  (10) Patent No.: US 9,077,618 B2
Sinha et al. (45) Date of Patent: Jul. 7, 2015

(54) SERVICE LEVEL MIRRORING IN ETHERNET NETWORK (71) Applicants: Abhishek Sinha, Woodland Hills, CA (US); Frederic Spieser, Encino, CA (US)

(72) Inventors: Abhishek Sinha, Woodland Hills, CA (US); Frederic Spieser, Encino, CA (US)

(73) Assignee: Alcatel Lucent, Boulogne-Billancourt (FR)

(*) Notice: Subject to any disclaimer, the term of this patent is extended or adjusted under 35 U.S.C. 154(b) by 165 days.

(21) Appl. No.: 13/726,117

(22) Filed: Dec. 22, 2012

(65) Prior Publication Data
US 2014/0177428 A1 Jun. 26, 2014

(51) Int. Cl.
*H04L 12/26* (2006.01)
*H04J 1/16* (2006.01)
*H04L 12/24* (2006.01)
*H04L 12/46* (2006.01)

(52) U.S. Cl.
CPC .......... *H04L 41/0686* (2013.01); *H04L 43/022* (2013.01); *H04L 43/12* (2013.01); *H04L 12/4633* (2013.01); *H04L 12/4645* (2013.01)

(58) Field of Classification Search
USPC ................. 370/216–225, 236–251, 355–469; 709/225–251
See application file for complete search history.

(56) References Cited

U.S. PATENT DOCUMENTS

| 5,959,989 | A  | * | 9/1999 | Gleeson et al. ............... 370/390 |
| 6,041,042 | A  | * | 3/2000 | Bussiere ........................ 370/245 |
| 6,894,999 | B1 | * | 5/2005 | Acharya ....................... 370/352 |
| 7,263,597 | B2 | * | 8/2007 | Everdell et al. ................. 712/11 |
| 7,555,562 | B2 | * | 6/2009 | See et al. ....................... 709/240 |
| 8,239,960 | B2 | * | 8/2012 | Frattura et al. ................. 726/26 |
| 8,358,591 | B2 | * | 1/2013 | Chuang et al. ................ 370/253 |
| 8,520,540 | B1 | * | 8/2013 | Foschiano et al. ............ 370/252 |
| 2003/0120822 | A1 | * | 6/2003 | Langrind et al. .............. 709/251 |
| 2004/0003094 | A1 | * | 1/2004 | See ................................ 709/227 |
| 2009/0080425 | A1 | * | 3/2009 | Parker et al. .................. 370/390 |
| 2011/0231570 | A1 | * | 9/2011 | Altekar et al. ................. 709/236 |
| 2014/0010096 | A1 | * | 1/2014 | Kamble et al. ................ 370/252 |

* cited by examiner

*Primary Examiner* — Man Phan
(74) *Attorney, Agent, or Firm* — Garlick & Markison (57) ABSTRACT A mirror maintenance endpoint (MEP) is hosted on a provider edge switch within an Ethernet network to perform service level mirroring to a network management device of the Ethernet network. The mirror MEP is configured by the network management device to receive all mirrored frames from provider edge switches in a service provider network and to switch the mirrored frames to the network management device. The mirrored frames are mirrored by the provider edge switches to the mirror MEP during mirror sessions initiated by the network management device.

17 Claims, 6 Drawing Sheets

SERVICE LEVEL MIRRORING IN ETHERNET NETWORK

BACKGROUND OF THE INVENTION

1. Technical Field of the Invention

The present invention relates in general to Ethernet Operations, Administration and Management (OAM), and in particular, to the incorporation of new features in the Ethernet OAM protocol.

2. Description of Related Art

Ethernet OAM provides protocols for installing, monitoring and troubleshooting Ethernet metropolitan area networks (MANs) and Ethernet wide area networks (WANs). Several different standards bodies have developed working protocols for Ethernet OAM. For example, the Institute of Electrical and Electronics Engineers (IEEE) has produced the IEEE 802.1ag standard, which defines Connectivity Fault Management (CFM) in enterprise and carrier networks. Similarly, the International Telecommunication Union Telecommunication Standardization Sector (ITU-T) has produced the Y.1731 standard, which defines both fault management and performance monitoring in carrier networks.

The IEEE 802.1ag standard further partitions the network into hierarchical maintenance domains (MDs) and defines roles for maintenance endpoints (MEPs) and maintenance intermediate points (MIPs) within each domain. For example, a customer (higher) level domain includes maintenance endpoints (MEPs) within customer premises equipment and maintenance intermediate points (MIPs) within provider edge switches and core operator switches, while a provider (lower) level domain includes MEPs within provider edge switches and MIPs within core operator switches. Thus, the lower level domain MEPs are nested with the higher level domain MIPs within the provider edge switches.

Currently, the Ethernet OAM Protocol, as described in the IEEE 802.1ag standard and similarly described in the ITU-T Y.1731 standard, includes the following primitives: Fault Detection, Fault Verification and Fault Isolation. Fault Detection is supported using CFM Continuity Check Messages (CCMs), which are "heartbeat" messages issued periodically by maintenance endpoints (MEPs) in the network. CCMs allow MEPs to detect loss of service connectivity amongst themselves, enable MEPs to discover other MEPs within an Ethernet maintenance domain (MD) and enable maintenance intermediate points (MIPs) to discover MEPs.

Fault Verification is supported using CFM Loop-Back messages, which are transmitted by MEPs at the request of an administrator to verify connectivity to a particular maintenance point (MEP or MIP). Fault Isolation is supported using link trace messages, which are transmitted by a MEP at the request of an administrator to track the path (hop-by-hop) to a destination MEP. Link trace allows the transmitting MEP to discover connectivity data about the path.

However, the current standards for Ethernet OAM in IEEE 802.1ag and ITU-T Y.1731 do not provide any tools for service level mirroring of the traffic. Therefore, network administrators often have to address customer complaints regarding specific network problems by deploying employees to the customer site to monitor the traffic under certain conditions and in certain traffic scenarios. Therefore, what is needed is a standardized tool for configuring service level mirroring end to end and on the fly for remote monitoring and debugging.

SUMMARY OF THE INVENTION

An apparatus, in one embodiment, includes a first port coupled to a service provider network via a first Ethernet link, a second port coupled to a network management device via a second Ethernet link, a mirror maintenance endpoint and a processor for executing the mirror maintenance endpoint. The mirror maintenance endpoint is configured by the network management device to receive all mirrored frames from provider edge switches in the service provider network via the first port and switch the mirrored frames to the network management device via the second port. The mirrored frames are mirrored by the provider edge switches to the mirror maintenance endpoint during mirror sessions initiated by the network management device.

In an exemplary embodiment, the mirrored frames are encapsulated frames, and the processor is further operable to de-capsulate the encapsulated frames to produce native Ethernet frames that are switched to the network management device via the second port. For example, in one embodiment, the encapsulated frame includes an original Ethernet header of an original Ethernet frame encapsulated within the encapsulated frame and an encapsulated Ethernet header of the encapsulated frame. The encapsulated Ethernet header includes as a destination address, a source address, a Virtual Local Area Network (VLAN) tag and a Connectivity Fault Management (CFM) header. The destination address is a Medium Access Control (MAC) address of the mirror maintenance endpoint, the source address is a MAC address of a provider edge switch that mirrored the original Ethernet frame and produced the encapsulated frame, the VLAN tag identifies a VLAN provisioned for a mirror session and the CFM header indicates that the encapsulated frame carries a mirrored Ethernet frame.

In another exemplary embodiment, the apparatus further includes a memory maintaining a list of provider maintenance endpoints, each hosted on one of the provider edge switches in the service provider network. The processor further executes the mirror maintenance endpoint to transmit periodic loopback messages to each of the provider maintenance endpoints on the list.

A provider edge switch, in another embodiment, includes a port coupled to a service provider network via an Ethernet link, a provider maintenance endpoint hosted on the provider edge switch and a processor for executing the provider maintenance endpoint. The provider maintenance endpoint receives a mirror session setup from a network management device in the service provider network to configure a mirror session for mirroring frames to the network management device, determines a mirror maintenance endpoint hosted on an additional provider edge switch within the service provider network that is pre-configured to receive all mirrored frames from all provider edge switches within the service provider network, produces mirrored frames from original frames during the mirror session and switches the mirrored frames to the mirror maintenance endpoint for forwarding to the network management device.

In an exemplary embodiment, the provider edge switch further includes a memory maintaining a list of additional provider maintenance endpoints, each hosted on one of the provider edge switches in the service provider network. The processor further executes the provider maintenance endpoint to receive a mirror maintenance endpoint configuration message from the network management device, and in response, add the mirror maintenance endpoint to the list.

In another exemplary embodiment, the mirror session setup configures the processor to mirror at least one of incoming original frames and outgoing original frames for a particular one of a plurality of service levels during the mirror session. In yet another exemplary embodiment, the mirror session setup indicates a time interval for the mirror session.

In still another exemplary embodiment, the mirror session setup includes at least one policy based signature that specifies particular ones of the original frames to mirror.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Embodiments of the present invention provide an enhancement to Ethernet OAM protocols, as described in IEEE 802.1ag and ITU-T Y.1731, to support traffic mirroring for analysis and debugging. Traffic mirroring, as a debugging tool, can greatly enhance the capability of a network administrator to address customer reported traffic issues by remotely mirroring network traffic on a per service level basis to a remote management site, where the traffic can be analyzed and debugging can be performed. To facilitate remote mirroring, a mirror maintenance endpoint (MEP) is configured on a provider edge bridge/switch that is coupled to a management network of the service provider.

Figure 1:
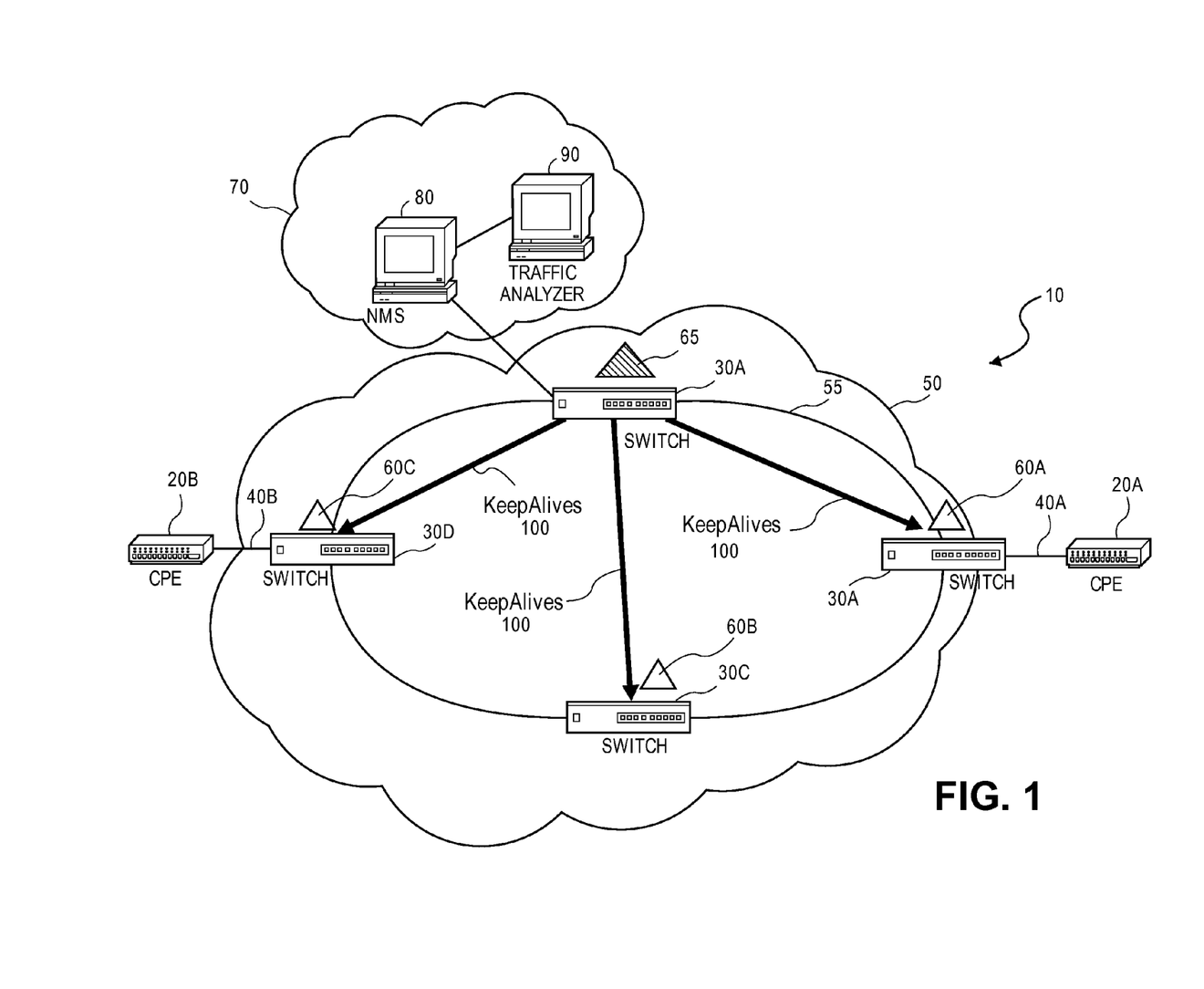
FIG. 1 illustrates an exemplary Ethernet network including a mirror maintenance endpoint (MEP) for facilitating remote service level mirroring, in accordance with embodiments of the present invention.

Referring now to FIG. 1, there is illustrated an exemplary Ethernet network 10 implementing enhanced Ethernet OAM protocols, in accordance with embodiments of the present invention. The Ethernet network 10 includes a service provider network 50 and a management network 70. The management network 70 includes a network management station (NMS) 80 and traffic analyzer 90 for remote traffic analysis and debugging.

The service provider network 50 may be, for example, an Ethernet metropolitan area network (MAN) or an Ethernet wide area network (WAN). In embodiments in which the service provider network 50 is an Ethernet MAN, the service provider network 50 may service, for example, one or more residential complexes, malls, small/medium businesses, college campuses and/or other type(s) of facilities/customers that may span a metropolitan area or campus.

The service provider network 50 includes a plurality of provider edge switches 30A-30D. Each of the provider edge switches 30A-30D may be coupled to a plurality of respective customer premises equipment (CPE) 20A and 20B, only two of which are shown for simplicity. For example, CPE 20A and 20B may include various customer devices, such as customer bridges/switches, wireless routers, wireless base stations, computers, set top boxes, VoIP phones and any other customer equipment having an Ethernet connection to a provider edge switch 30A-30D.

The provider edge switches 30A-30D are located at the boundary between the customer domain and the provider domain, such that the provider edge switches 30A-30D are coupled to the CPE 20A and 20B via respective Ethernet links 40A and 40B and to the service provider network 50 via additional Ethernet links 55. The service provider network 50 includes the provider edge switches 30A-30D and any core operator bridges/switches (not shown) within the service provider network 50. In one embodiment, the provider edge switches 30A-30D are each coupled to a respective local area network (LAN) including one or more CPE 20A-20B, and operate to couple the LANs to the service provider network 50.

Each of the provider edge switches 30B-30D hosts a respective provider maintenance endpoint (MEP) 60A-60C, which are software programs that run Ethernet OAM primitives (algorithms), such as fault detection, fault verification and fault isolation. For example, each provider MEP 60A-60C may be configured on a port of the respective provider edge switch 30B-30D to support OAM operations for a single Virtual Local Area Network (VLAN) or a set of VLAN's bound to that provider MEP 60A-60C.

In addition, in accordance with embodiments of the present invention, one of the provider edge switches (e.g., switch 30A) hosts a mirror MEP 65, which is a software program that runs a service level remote mirroring Ethernet OAM primitive in addition to the other Ethernet OAM primitives (i.e., fault detection, fault verification and fault isolation). In an exemplary embodiment, the mirror MEP 65 is hosted on the provider edge switch 30A that is directly coupled to a network management station (NMS) within the management network 70.

To facilitate remote service level mirroring, the NMS 80 defines the mirror MEP 65 on each of the provider MEP's 60A-60C in the service provider network 50. The mirror MEP 65 then periodically generates and transmits KeepAlive messages 100, such as CFM Loop-Back messages, to each provider MEP 60A-60C within the service provider network 50. The KeepAlive messages 100 ensure that the provider MEPs 60A-60C have knowledge of and maintain the Medium Access Control (MAC) address of the mirror MEP 65 within a list of MEP's stored therein. The KeepAlive messages 100 are generated automatically by the mirror MEP 65 without being initiated by the NMS 80 or other network administration device.

Figure 2:
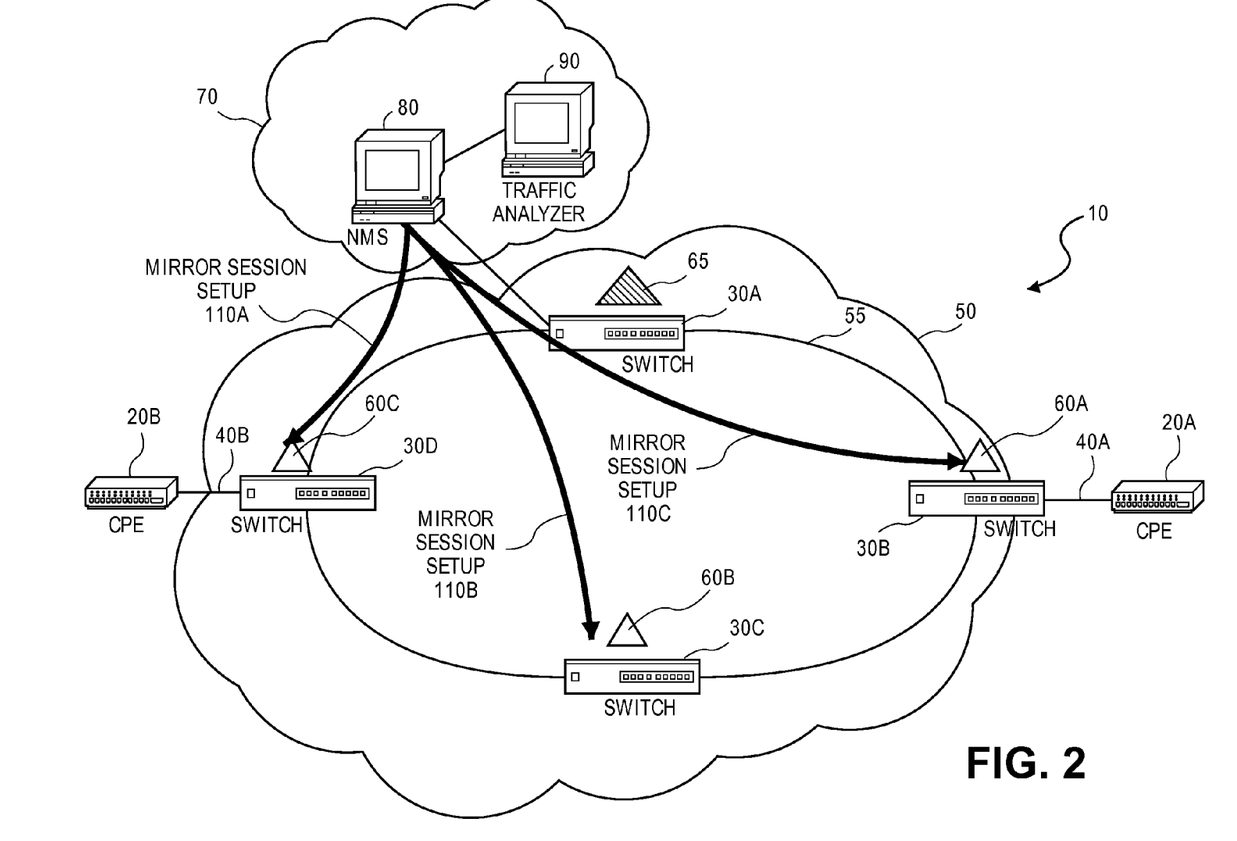
FIG. 2 illustrates exemplary signaling to provision mirroring sessions within the Ethernet network, in accordance with embodiments of the present invention.

Turning now to FIG. 2, the NMS 80 initiates remote mirroring sessions in the run time with particular provider MEPs 60A-60C to analyze and/or debug incoming and/or outgoing traffic on particular provider edge switches 30B-30D. For example, the NMS 80 can transmit a mirror session setup message 110A to provider MEP 60C via the service provider network 50 to initiate a mirror session with provider MEP 60C, transmit another mirror session setup message 110B to provider MEP 60B via the service provider network 50 to initiate a mirror session with provider MEP 60B and transmit yet another mirror session setup message 110C to provider MEP 60A via the service provider network 50 to initiate a mirror session with that provider MEP 60A.

Each mirror session setup message 110A-110C indicates the particular service level (i.e., VLAN) for which mirroring is to occur and whether incoming and/or outgoing traffic is to be mirrored. The session setup messages 110A-110C may also include an optional time interval for mirroring frames. For example, the time interval may specify that traffic should be mirrored between a start time and an end time or for a particular amount of time (e.g., 5 minutes) after receipt of the setup message 110A-110C or after mirroring has begun.

In addition, each mirror session setup message 110A-110C may further include one or more additional policy based signatures to specify the type of traffic to be mirrored in order to isolate traffic at a more granular level. For example, the policy based signatures may specify fields from Layer 2 (L2) to Layer 4 (L4) for IPv4 and IPv6 traffic that can be used by the provider MEP 60B-60D to determine which traffic to mirror. In an exemplary embodiment, the provider MEP 60B-60D can compare the fields and/or field settings in particular incoming and/or outgoing traffic with the policy based signatures to determine whether the traffic should be mirrored. If the field(s) and/or field setting(s) of a particular frame match the policy based signatures, the provider MEP 60B-60D can mirror the frame. For example, the policy based signatures may specify that only frames originated from a particular source address or destined for a particular destination address should be mirrored. As another example, the policy based signatures may specify that only Continuity Check Messages (CCMs) should be mirrored.

Figure 3:
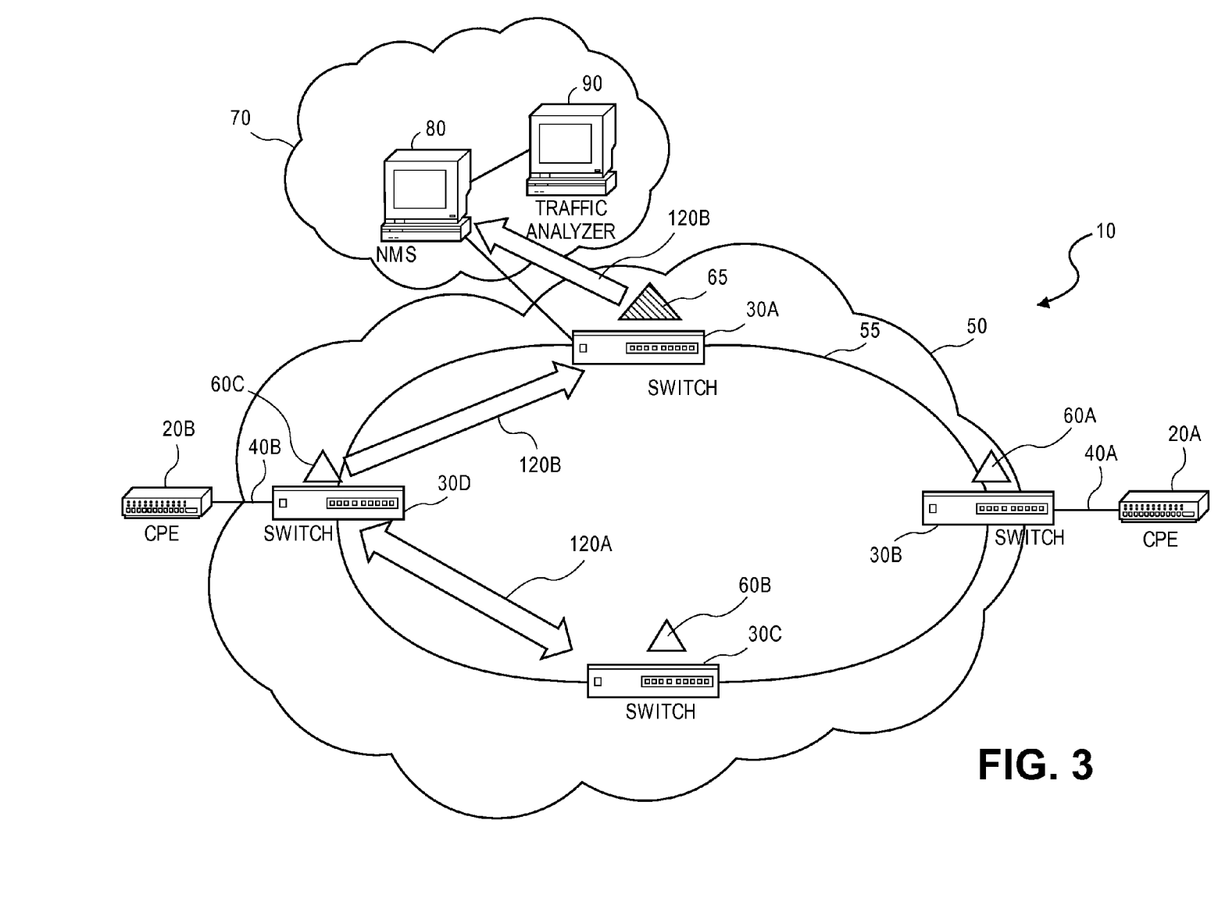
FIG. 3 illustrates exemplary mirroring towards the mirror MEP within the Ethernet network, in accordance with embodiments of the present invention.

Once a mirror session is setup, as shown in FIG. 3, the designated traffic can be mirrored to the mirror MEP 65. For example, during a mirror session with provider MEP 60C, the provider edge switch 30D can mirror original incoming and/or outgoing traffic 120A to produce mirrored traffic 120B and transmit the mirrored traffic 120B to the mirror MEP 65. For example, the original traffic 120A can be encapsulated using any type of encapsulation method, such as Q-in-Q (802.1ad) or Mac-In-Mac (802.1ah) to produce the mirrored traffic 120B. In addition, any type of tunnel technique can also be used to transmit the mirrored traffic 120B to the mirror MEP 65.

To enable service level mirroring of the traffic, the provider edge switches 30b-30d are each further configured to perform service level mirroring. For example, the supporting switching hardware within each of the provider edge switches 30b-30d may be configurable to mirror incoming and/or outgoing traffic on a per service level basis (per VLAN).

Upon receipt of the mirrored traffic 120B, the mirror MEP 65 facilitates the provider edge switch 30A switching the mirrored traffic 120B to the NMS/Traffic Analyzer 80/90 for further analysis and/or debugging. In one embodiment, the mirror MEP 65 de-capsulates the mirrored traffic 120B and sends the native Ethernet frames to the NMS/Traffic Analyzer 80/90.

Figure 4:
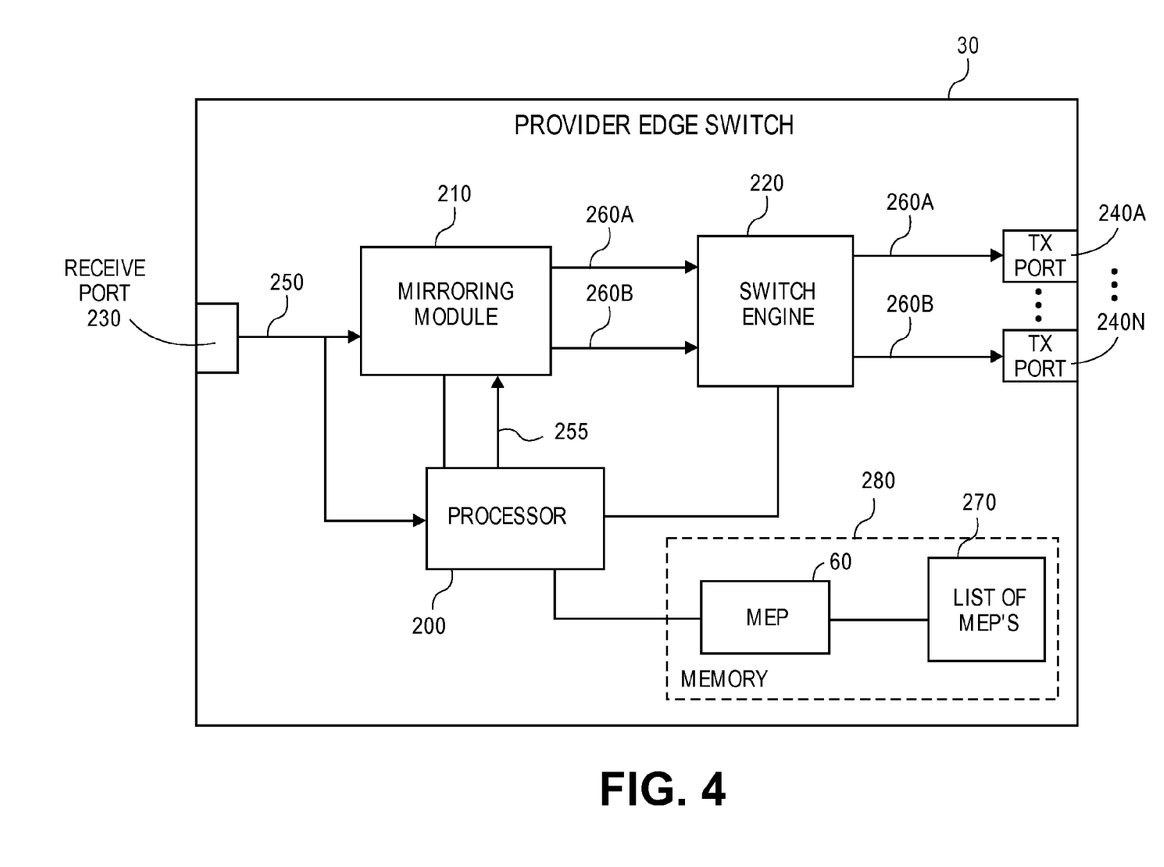
FIG. 4 is a block diagram illustrating exemplary functionality of a provider edge switch hosting a provider MEP, in accordance with embodiments of the present invention.

FIG. 4 illustrates exemplary functionality of a provider edge switch 30 hosting a provider MEP 60, in accordance with embodiments of the present invention. The provider edge switch 30 includes a processor 200, a mirroring module 210, a switch engine 220, plurality of ports 230 and 240A . . . 240N and a memory 280. Each of the ports 230 and 240A . . . N is coupled to an Ethernet link to connect to either customer premises equipment or to the service provider network. Although all ports 230 and 240A . . . N are capable of transmitting and receiving frames, to aid in understanding of the operation of the provider edge switch 30, one of the ports 230 is labeled a receive port for receiving an incoming frame, while the other ports 240A . . . N are labeled transmit ports for transmitting outgoing frames.

The memory 280 includes a list of MEPs 270 (including the mirror MEP), along with the software program for the provider MEP 60. The processor 200 is coupled to the memory 280 to execute the provider MEP 60. For example, the processor 200 can execute the provider MEP 60 upon receiving a mirror session setup message to determine the MAC address of the mirror MEP.

The processor 200 can further control the mirroring module 210 and switch engine 220 to enable mirroring of frames and transmission of mirrored frames to the mirror MEP based on the conditions specified in the mirror session setup message. For example, in embodiments in which the mirror session setup message indicates that incoming frames received on receive port 230 should be mirrored to the mirror MEP, the processor 200 can provide instructions 255 to the mirroring module 210 to mirror an original frame 250 received on receive port 230 to produce an outgoing frame 260A (corresponding to the incoming frame 250) and a mirrored frame 260B. The outgoing frame 260A and the mirrored frame 260B can then be provided to the switch engine 220 to transmit the outgoing frame 260A to the original destination via a first transmit port 240A and the mirrored frame 260B to the mirror MEP via a second transmit port 240N. It should be understood that the incoming frame 250 may also be processed by the processor 200 to produce the outgoing frame 260A that is provided to switch engine 220.

As used herein, the term "processor" is generally understood to be a device that drives a general-purpose computer, such as a PC. It is noted, however, that other processing devices, such as microcontrollers, Field Programmable Gate Arrays (FPGAs), Application Specific Integrated Circuits (ASICs), Digital Signal Processing chips, or a combination thereof, can be used as well to achieve the benefits and advantages described herein. In addition, as used herein, the term "memory" includes any type of data storage device, including but not limited to, a hard drive, random access memory (RAM), read only memory (ROM), flash memory or other type of storage device or storage medium.

The mirroring module 210 includes any hardware, software and/or firmware for mirroring frames. For example, the mirroring module 210 may include encapsulation software that enables encapsulation of the original frame 250 into the mirrored frame 260B for switching to the mirror MEP. In one embodiment, the encapsulation software includes instructions for generating an encapsulation header that is prepended to the original header of the original frame 250 to produce the mirrored frame 260B.

Figure 5:
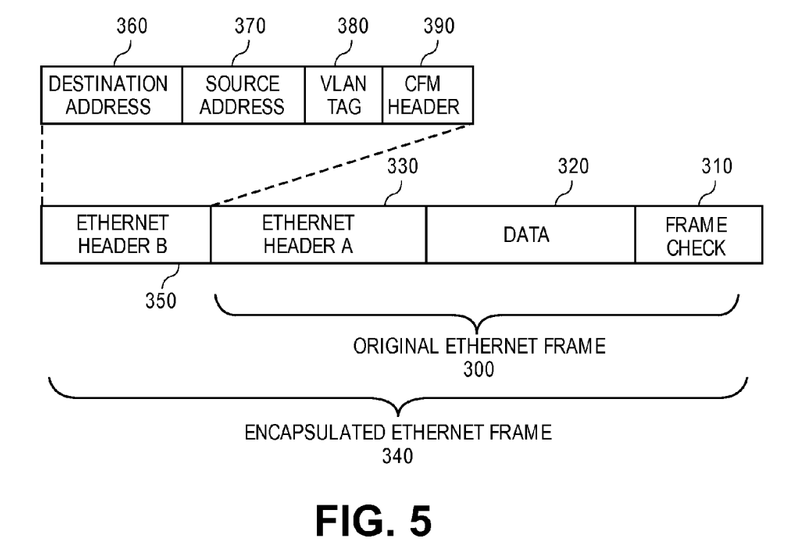
FIG. 5 illustrates an exemplary format of a mirrored frame, in accordance with embodiments of the present invention.

An example of a mirrored frame is shown in FIG. 5. In this example, the mirrored frame is an encapsulated Ethernet frame 340 that includes an original Ethernet frame 300 formed of a frame check sequence 310, data 320 and a header 330 (referred to as Ethernet Header A). The encapsulated Ethernet frame 340 also includes an additional Ethernet header 350 (referred to as Ethernet Header B). Ethernet Header B 350 includes a Destination Address 360, Source Address 370, VLAN tag 380 and CFM Header 390. The Destination Address 360 is the MAC address of the mirror MEP, while the Source Address 370 is the MAC address of the provider MEP that generated the mirrored frame. The VLAN tag 380 may be the service VLAN tag for the source provider MEP or any other VLAN provisioned for the mirror session. The CFM Header 390 indicates that the encapsulated Ethernet frame 340 carriers a mirrored frame.

Figure 6:
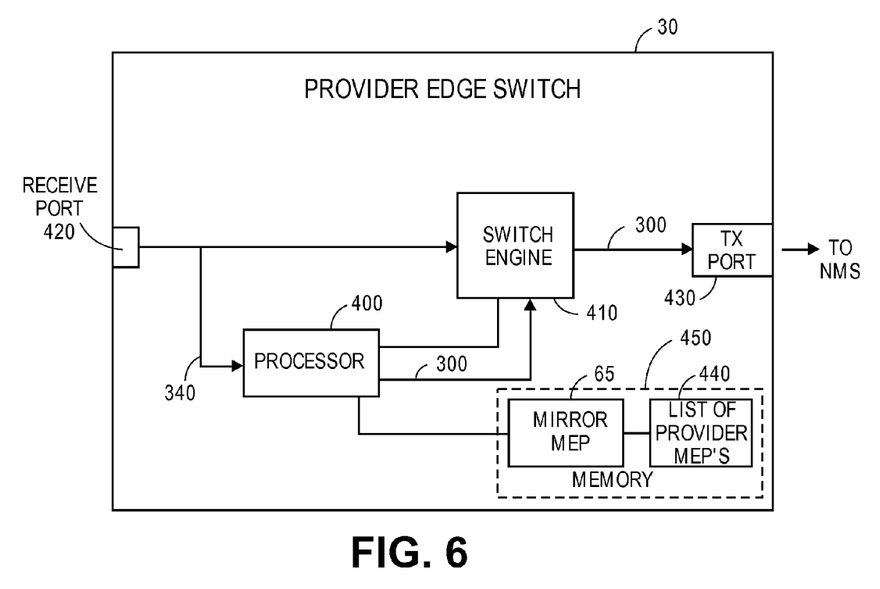
FIG. 6 is a block diagram illustrating exemplary functionality of a provider edge switch hosting the mirror MEP, in accordance with embodiments of the present invention.

FIG. 6 illustrates exemplary functionality of a provider edge switch 30 hosting the mirror MEP 65, in accordance with embodiments of the present invention. The provider edge switch 30 includes a processor 400, a switch engine 410, a plurality of ports 420 and 430 (only two of which are shown for convenience) and a memory 450. Each of the ports 420 and 430 is coupled to an Ethernet link to connect to either the management network or to the service provider network. Although all ports 420 and 430 are capable of transmitting and receiving frames, to aid in understanding of the operation of the provider edge switch 30, one of the ports 420 is labeled a receive port for receiving an incoming frame, while the other port 430 is labeled a transmit port for transmitting outgoing frames.

The memory 450 includes a list of provider MEPs 440 within the service provider network, along with the software program for the mirror MEP 65. The processor 400 is coupled to the memory 450 to execute the mirror MEP 65. For example, the processor 400 can execute the mirror MEP 65 upon receiving an encapsulated Ethernet frame 340 via receive port 420. The mirror MEP 65 can determine that the encapsulated Ethernet frame 340 is a mirrored frame transmitted by one of the other provider edge switches in the service provider network based on the source and destination MAC addresses and/or the CFM header, de-capsulate the encapsulated Ethernet frame to produce the native (original) Ethernet frame 300 and enable the native Ethernet frame 300 to be switched to the NMS. For example, the processor 400 can execute the mirror MEP 65 to control the switch engine 410 to switch the native Ethernet frame 300 to the NMS within the management network via transmit port 430.

In addition, the processor 400 can further execute the mirror MEP 65 to generate and transmit Keep Alive messages (e.g., CFM Loopback messages) to each provider MEP on the list of provider MEPs 440 stored in the memory 450. The Keep Alive messages may be transmitted at pre-defined intervals determined by the mirror MEP 65.

Figure 7:
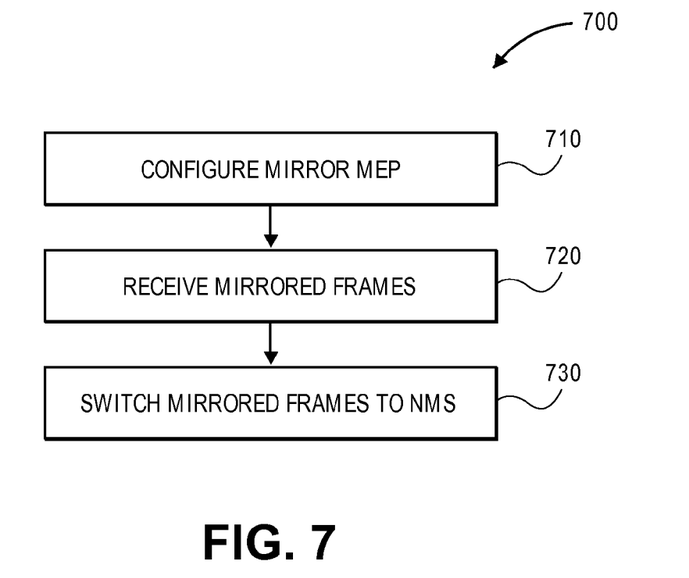
FIG. 7 is a flowchart illustrating an exemplary process for switching mirrored frames by the mirror MEP, in accordance with embodiments of the present invention.

FIG. 7 is a flowchart illustrating an exemplary process 700 for handling mirrored frames by the mirror MEP, in accordance with embodiments of the present invention. The process begins at 710, where the mirror MEP is configured on a provider edge switch of the service provider network. In one embodiment, the provider edge switch hosting the mirror MEP is directly coupled to the network management station (NMS) for the service provider network. At 720, the mirror MEP receives mirrored frames from another provider edge switch within the service provider network. In an exemplary embodiment, the mirrored frames are encapsulated frames that contain the original frames mirrored by the other provider edge switch during a mirror session initiated by the NMS. The mirror MEP de-capsulates the encapsulated frames, and at 730, switches the original frames to the NMS.

Figure 8:
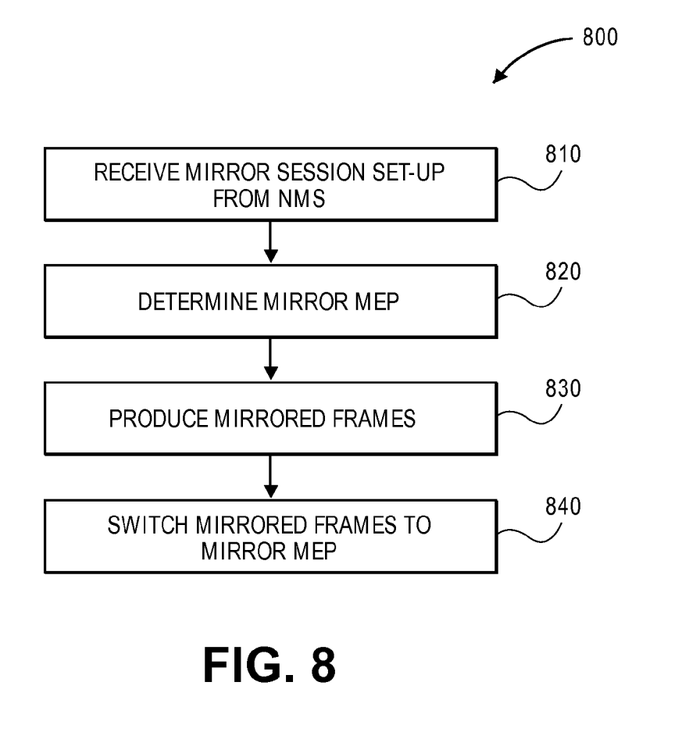
FIG. 8 is a flowchart illustrating an exemplary mirror session process, in accordance with embodiments of the present invention.

FIG. 8 is a flowchart illustrating an exemplary mirror session process 800, in accordance with embodiments of the present invention. The process begins at 810, where a provider edge switch receives a mirror session set-up message from the NMS of the service provider network. At 820, the provider MEP hosted in the provider edge switch determines the MAC address of the mirror MEP to which mirrored frames are to be sent during the mirror session. At 830, the provider edge switch produces mirrored frames from incoming and/or outgoing original frames for one or more service levels based on the mirror session set-up message. At 840, the provider edge switch switches the mirrored frames to the mirror MEP for transmission to the NMS, where the mirrored frames can be analyzed and/or used for debugging.

As will be recognized by those skilled in the art, the innovative concepts described in the present application can be modified, varied and adapted over a wide range of applications. Accordingly, the scope of the subject matter is not limited to any of the specific exemplary teachings discussed, but is instead defined by the following claims.

What is claimed is:

1. An apparatus, comprising:
   a first port coupled to a service provider network via a first Ethernet link;
   a second port coupled to a network management device via a second Ethernet link;
   a mirror maintenance endpoint configured by the network management device to receive all mirrored frames from provider edge switches in the service provider network via the first port and switch the mirrored frames to the network management device via the second port, the mirrored frames being mirrored by the provider edge switches to the mirror maintenance endpoint during mirror sessions initiated by the network management device, one of the mirrored frames being an encapsulated frame that includes an encapsulated header and an original Ethernet header of a native Ethernet frame encapsulated within the encapsulated frame; and
   a processor for executing the mirror maintenance endpoint to facilitate switching of the mirrored frames to the network management device, the processor being further operable to de-capsulate the encapsulated frame to produce the native Ethernet frame that is switched to the network management device via the second port.

2. The apparatus of claim 1, further comprising:
   a switch engine configurable by the processor to switch the mirrored frames from the first port to the second port.

3. The apparatus of claim 1, wherein the encapsulated Ethernet header includes a destination address, the destination address being a Medium Access Control (MAC) address of the mirror maintenance endpoint.

4. The apparatus of claim 1, wherein the encapsulated Ethernet header includes a source address, the source address being a MAC address of a provider edge switch that mirrored the original Ethernet frame and produced the encapsulated frame.

5. The apparatus of claim 1, wherein the encapsulated Ethernet header includes a Virtual Local Area Network (VLAN) tag that identifies a VLAN provisioned for a mirror session.

6. The apparatus of claim 1, wherein the encapsulated Ethernet header includes a Connectivity Fault Management (CFM) header that indicates the encapsulated frame carries a mirrored Ethernet frame.

7. The apparatus of claim 1, further comprising:
   a memory maintaining a list of provider maintenance endpoints, each hosted on one of the provider edge switches in the service provider network.

8. The apparatus of claim 7, wherein the processor further executes the mirror maintenance endpoint to transmit periodic Keep Alive messages to each of the provider maintenance endpoints on the list.

9. A provider edge switch, comprising:
   a port coupled to a service provider network via an Ethernet link;
   a provider maintenance endpoint hosted on the provider edge switch;
   a processor for executing the provider maintenance endpoint to:
      receive a mirror session setup from a network management device in the service provider network to configure a mirror session for mirroring frames to the network management device;
      determine a mirror maintenance endpoint hosted on an additional provider edge switch within the service provider network and pre-configured to receive all mirrored frames from all provider edge switches within the service provider network;

produce ones of the mirrored frames from original frames during the mirror session by encapsulating the original frames into encapsulated frames, each of the encapsulated frames including a respective encapsulated Ethernet header of the respective encapsulated frame and a respective original Ethernet header of the respective original frame; and switch the ones of the mirrored frames to the mirror maintenance endpoint for forwarding to the network management device.

10. The provider edge switch of claim 9, wherein the encapsulated Ethernet header includes a destination address, the destination address being a Medium Access Control (MAC) address of the mirror maintenance endpoint.

11. The provider edge switch of claim 9, wherein the encapsulated Ethernet header includes a source address, the source address being a MAC address of the provider maintenance endpoint.

12. The provider edge switch of claim 9, wherein the encapsulated Ethernet header includes a Virtual Local Area Network (VLAN) tag that identifies a VLAN provisioned for the mirror session.

13. The provider edge switch of claim 9, wherein the encapsulated Ethernet header includes a Connectivity Fault Management (CFM) header that indicates the encapsulated frame carries a mirrored frame.

14. The provider edge switch of claim 9, further comprising:

a memory maintaining a list of additional provider maintenance endpoints, each hosted on one of the provider edge switches in the service provider network and wherein the processor further executes the provider maintenance endpoint to:

receive a mirror maintenance endpoint configuration message from the network management device; and in response, add the mirror maintenance endpoint to the list.

15. The provider edge switch of claim 9, wherein the mirror session setup configures the processor to mirror at least one of incoming original frames and outgoing original frames for a particular one of a plurality of service levels during the mirror session.

16. The provider edge switch of claim 9, wherein the mirror session setup indicates a time interval for the mirror session.

17. The provider edge switch of claim 9, wherein the mirror session setup includes at least one policy based signature that specifies particular ones of the original frames to mirror.

* * * * *